April 21, 1942.  D. D. TIMMERMANN  2,280,675
VEHICLE OPERATED DOOR
Filed July 16, 1940  3 Sheets-Sheet 1

Inventor
Daniel D. Timmermann
By Lacey & Lacey, Attorneys

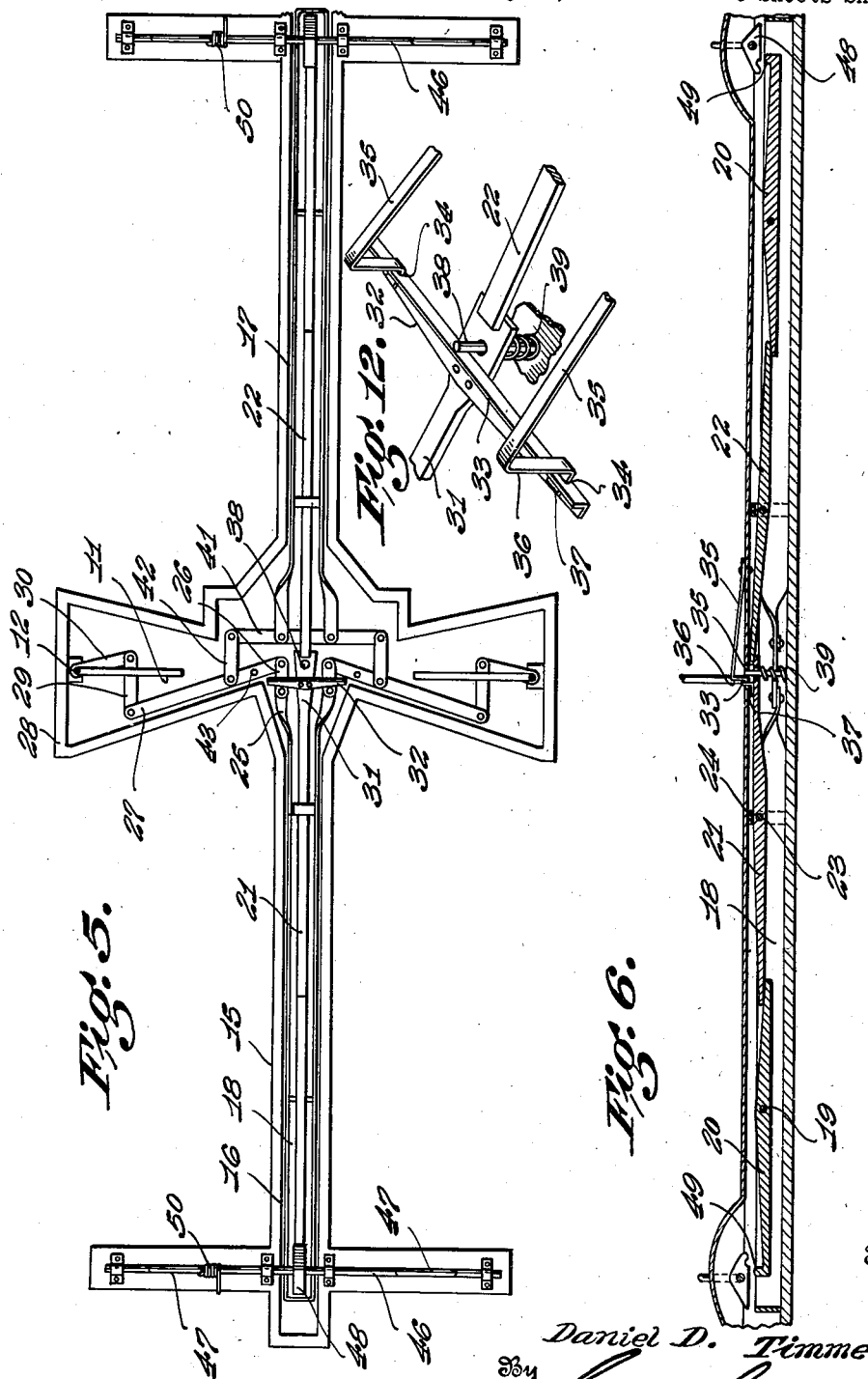

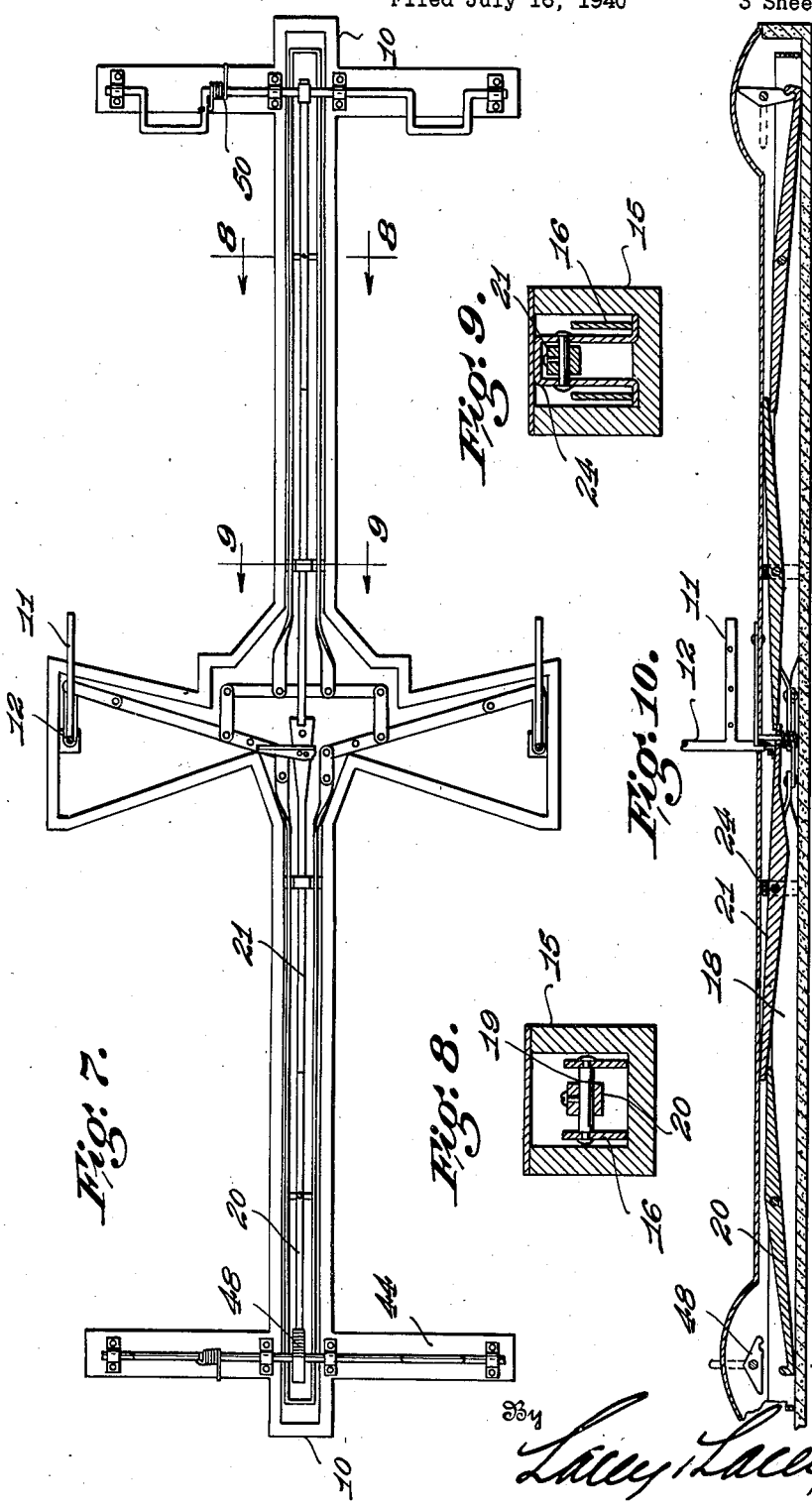

Patented Apr. 21, 1942

2,280,675

UNITED STATES PATENT OFFICE 2,280,675

VEHICLE-OPERATED DOOR

Daniel D. Timmermann, Palm Springs, Calif.

Application July 16, 1940, Serial No. 345,846

9 Claims. (Cl. 268—35)

This invention relates to door-operating mechanism and more particularly to a device for opening and closing garage doors.

The object of the invention is to provide a garage door-operating device, the construction of which is such that as an automobile or other vehicle approaches the garage, the doors thereof will be automatically moved to open position to permit the entrance of the automobile and after the automobile is within the garage the doors will automatically close and stay closed until it is desired to drive out of the garage when said doors will first open to permit exit of the automobile and then close and remain closed until the door-operating mechanism is again actuated by the approach of a vehicle.

A further object of the invention is to provide novel means for holding the garage doors in closed position and means actuated by the wheels of an approaching vehicle for first releasing the door-holding means and subsequently moving the doors to open position.

A still further object of the invention is generally to improve this class of devices so as to increase their utility, durability and efficiency.

Figure 1:
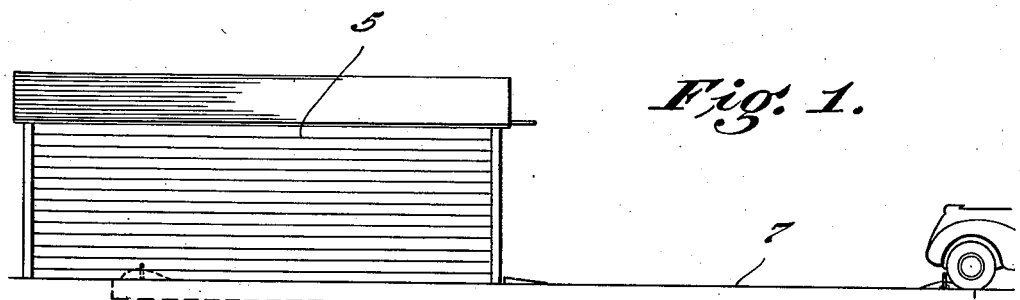
Figure 2:
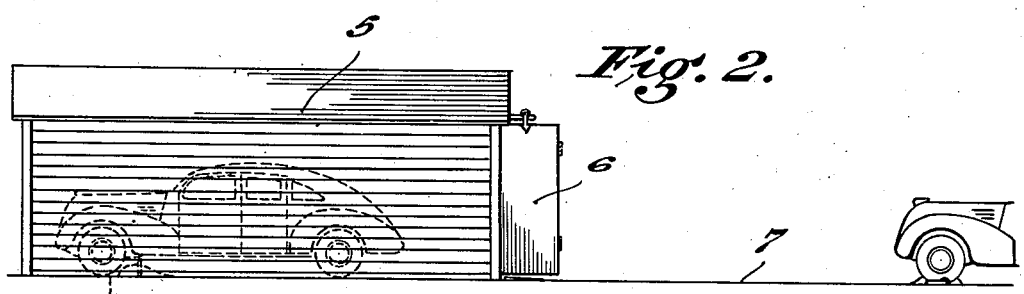
Figure 3:
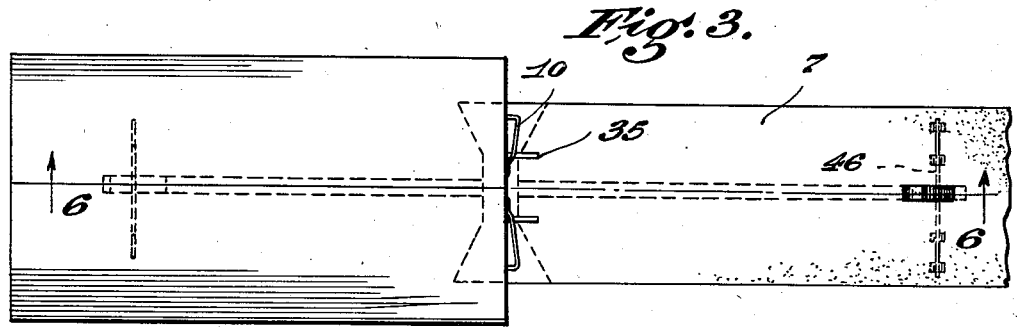
Figures 4, 11:
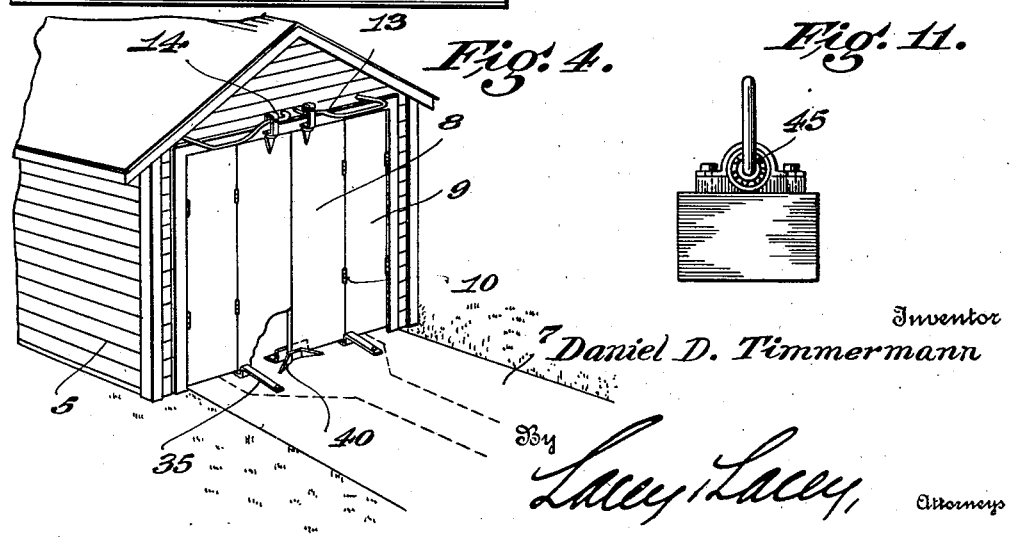

In the accompanying drawings forming a part of this specification and in which similar numerals of reference indicate corresponding parts in all the figures of the drawings:

Figure 1 is a side elevation of a garage provided with my improved door-operating mechanism and showing an automobile approaching the garage, Figure 2 is a similar view showing in full lines the front wheels of an automobile depressing the cranks of the adjacent operating shaft to automatically open the doors and in dotted lines the automobile within the garage, Figure 3 is a top plan view, the automobile being omitted for sake of clearness, Figure 4 is a perspective view of the entrance end of the garage showing the manner of mounting the doors and the position of the catches for holding the doors in closed position.

Figure 5 is a top plan view of the operating mechanism for effecting the automatic opening and closing of the garage doors, the position of the parts being shown when the doors are closed, Figure 6 is a vertical longitudinal section taken on the line 6—6 of Figure 5, Figure 7 is a top plan view showing the position of the operating mechanism when the doors are in open position, Figure 8 is a transverse sectional view taken on the line 8—8 of Figure 7, Figure 9 is a similar view taken on the line 9—9 of Figure 7, Figure 10 is a longitudinal sectional view taken on the line 10—10 of Figure 7, Figure 11 is an end view of one of the operating crank shafts showing the manner of mounting the same, and Figure 12 is a detail perspective view of the depressible door catches showing the manner of mounting said catches on the transverse supporting bar.

The improved door-operating mechanism forming the subject-matter of the present invention is principally designed for use in connection with garage doors, and by way of illustration is shown applied to a garage of standard construction, in which 5 designates the body of the garage, 6 the swinging doors and 7 the approach to said garage. The doors 6 are each preferably formed in two sections 8 and 9 having their abutting faces hingedly connected at 10 so as to permit said sections to fold one upon the other when the doors are moved to open position. The inner sections 9 of the doors are secured to spaced arms 11 extending laterally from vertical pivot posts 12 mounted for turning movement in the frame of the garage, and disposed above the doors 6 is an overhead track 13 on which are mounted roller carrying brackets 14 secured to the inner door sections 8, as best shown in Figure 4 of the drawings. The overhead track 13 is bowed outwardly so as to cause the door sections to swing outwardly and laterally on the hinges 10 when the doors are moved to open position, as will be readily understood.

Embedded in the ground or concrete constituting the approach 7 and floor of the garage, respectively, is a casing 15 in which is housed and protected the door-operating mechanism which will now be described. Slidably mounted for longitudinal movement within the casing 15 at the front and rear of the garage doors are frames 16 and 17 each consisting of spaced longitudinal bars defining an intermediate channel 18. Disposed within the channels 18 and pivotally mounted at 19 in the walls of the sliding frames are trip bars 20, the inner ends of which overlap similar auxiliary trip bars 21 and 22 having their intermediate portions pivotally mounted at 23 on stationary yokes or brackets 24 disposed between the walls of said sliding frames, as best shown in Figure 9 of the drawings. The inner ends of the side bars constituting the sliding frame 16 are twisted to form flattened portions 25 and pivotally connected to said flattened portions are relatively short links 26 which links are, in turn, pivotally connected to relatively long links 27 arranged within an extension 28 of the casing 15. The outer ends of the long link 27 are pivotally connected through the medium of relatively short links 29 to crank arms 30 extending laterally from the lower ends of the pivot post 12 so that, when longitudinal movement is imparted to the sliding frames 16 and 17, the link construction just described will move the garage doors to open position. The inner end of the trip bar 21 is provided with a tapered head 31 and extending transversely of said head and secured thereto in any suitable manner is a bar 32 having an upstanding flange 33 provided with spaced openings 34.

Disposed in front of the garage doors are spaced spring-pressed holding members or catches 35 which are inclined upwardly in the direction of the garage door and thence bent downwardly to form vertical stop shoulders 36 terminating in laterally extending lips 37 which fit within the openings 34 in the bar 32. The outer ends of the spring catches 35 are anchored to the casing extension 28 so that, when the outer ends of the auxiliary trip bars 21 and 22 are elevated, the catches 35 will be depressed and thus permit the doors to swing to open position. A vertical pin 38 extends through the head 31 of the trip bar 21 and surrounding said pin and interposed between the bottom of the casing and the head 31 is a coiled spring 39 which serves to elevate the head 31 and return the catches 35 to locking position in front of the doors when upward pressure on the inner ends of the auxiliary trip bars 21 and 22 has been removed.

Mounted on the roadway 7 between the holding members or catches 35 is a channeled guide member 40 which receives the lower ends of the sections 8 of the garage doors when the doors are closed. The inner ends of the side bars of the sliding frame 17 are connected to a transverse bar 41 which is, in turn, connected by relatively short links 42 to the long links 27, the latter being fulcrumed on vertical pivot pins 43 so as to permit rocking movement of said links selectively by either the sliding frame 16 or 17. Disposed at the ends of the frames 16 and 17 are bolsters 44 on which are journaled in suitable roller bearings 45 transverse operating shafts 46 each provided with an angular crank arm 47. Mounted on the intermediate portion of each shaft 46 is a trip device or block 48 adapted to engage a lug or projection 49 on the adjacent trip bar and move said bar together with the adjacent sliding frame longitudinally of the roadway. A spring 50 is operatively connected with each shaft 46 for normally supporting the crank arms 47 in a vertical plane.

In operation, as an automobile or other vehicle approaches the garage, the wheels of the automobile will engage the adjacent crank arms 47 and turn the crank shaft 46. As the crank shaft rotates, the trip block 48 will engage the adjacent lug 49 and move the sliding frame 17 together with the adjacent trip bar 20 longitudinally of the roadway. The trip block 48 will depress the outer end of the trip bar 20 and cause the inner end of said trip bar to elevate the overlapping end of the auxiliary trip bar 22, thereby exerting a downward pressure on the head 31 and automatically depressing the resilient holding members or catches 35 so as to permit opening of the garage doors and at the same time the sliding movement of the frame 17 will actuate the links 41, 42, 27 and 29, and the crank arms 30 of the vertical rods 12 to automatically move the doors to open position, thereby permitting the automobile to enter the garage. After the automobile enters the garage, the front wheels of the automobile by engagement with the adjacent crank arms 47 will rotate the shaft 46 on which said crank arms are mounted and actuate the parts to automatically close the doors and in which position they will be held by the spring catches 35. As the automobile leaves the garage, the front wheels thereof in passing over the crank arm 47 will tilt said crank arm so as to automatically open the garage doors and permit exit of the automobile and as the automobile travels over the crank arms in the roadway or approach to the garage, the wheels of the automobile will rock said crank arms and through the medium of the mechanism previously described automatically close the doors and in which position they will be securely held by the spring-holding members 35 until an automobile or other vehicle again approaches the garage.

From the foregoing description, it is thought that the construction and operation of the device will be readily understood by those skilled in the art and further description thereof is deemed unnecessary.

Having thus described the invention, what is claimed as new is:

1. The combination with a building having swinging doors, of door-operating mechanism comprising sliding members operatively connected with the doors, main trip bars movable with the sliding members, auxiliary trip bars independent of said sliding members, spring catches operatively connected with the auxiliary trip bars for normally holding the doors in closed position, and trip devices actuated by engagement with the wheels of a vehicle for successively releasing the catches and moving the doors to open position.

2. The combination with a building having swinging doors, of door-operating mechanism comprising sliding frames, links forming a connection between said frames and the swinging doors, main trip bars movable with the sliding frames, auxiliary trip bars independent of said sliding frames, resilient catches operatively connected with the auxiliary trip bars for normally holding the doors in closed position, and trip devices actuated by engagement with the wheels of a vehicle for actuating the sliding frames and auxiliary trip bars to successively depress the catches and move the doors to open position.

3. The combination with a building having swinging doors, of door-operating mechanism comprising frames slidably mounted on opposite sides of the doors, links forming a connection between said sliding frames and swinging doors, overlapping main and auxiliary trip bars pivotally housed within the sliding frames, the main trip bars being movable with the sliding frames, depressible catches operatively connected with the auxiliary trip bars for normally holding the doors in closed position, transverse crank shafts journaled at the opposite ends of the sliding frames, and trip blocks carried by said shafts and adapted to engage the main trip bars to successively depress the spring catches and move the doors to open position.

4. The combination with a building having swinging doors, of door-operating mechanism comprising frames mounted for longitudinal sliding movement on opposite sides of said doors and operatively connected therewith, overlapping trip bars pivotally mounted within the frames, one of the trip bars of each frame being movable therewith and the other movable independently of the frame, spring catches operatively connected with one of the independently movable trip bars, crank shafts disposed on opposite sides of the swinging doors at the ends of the adjacent sliding frames, and trip devices carried by the crank shafts and actuated by engagement with the wheels of a vehicle for tilting the adjacent trip bar to depress the spring catches and actuate the sliding frames to automatically open the doors.

5. The combination with a building having swinging doors, of door-operating mechanism comprising frames mounted for sliding movement on opposite sides of the doors and operatively connected therewith, trip bars pivotally mounted within the sliding frames and having their outer ends provided with upstanding lugs, brackets disposed within the sliding frames, auxiliary trip bars pivotally mounted in the brackets and overlapping the first-mentioned trip bars, spring catches operatively connected with the auxiliary trip bars, and trip devices disposed at the opposite ends of the sliding frames, said trip devices being selectively operable by contact with the wheels of a vehicle to engage the lug on the adjacent trip lever and tilt the auxiliary trip lever to depress the catches and actuate the adjacent sliding frame to move the doors to open position.

6. The combination with a building having swinging doors, of door-operating mechanism comprising oppositely disposed sliding frames, links forming a pivotal connection between the swinging doors and said frames, trip bars pivotally mounted in the sliding frames and provided with terminal upstanding stop lugs, brackets disposed within the frames, auxiliary trip bars pivotally mounted in the brackets and having their outer ends overlapping the first-mentioned trip bars, a transverse bar connected to the inner end of one of the auxiliary trip bars and provided with slots, spring catches having terminal lips fitted in said slots, crank shafts mounted for rotation at the outer ends of the sliding frames, and a trip device mounted on each shaft and operable by engagement with the wheels of a vehicle for contacting the adjacent stop lug to tilt said trip bars and depress the catches and subsequently actuate the adjacent sliding frame to move the doors to open position.

7. The combination with a building having swinging doors provided with crank arms, of door-operating mechanism comprising sliding members, links forming a pivotal connection between said members and the crank arms of the swinging doors, trip bars disposed within the sliding frames and pivotally connected therewith, brackets arranged within said sliding frames, auxiliary trip bars pivotally mounted in the brackets, the inner end of one of said auxiliary trip bars being provided with an opening, a pin extending through said opening, a spring surrounding the pin and bearing against the auxiliary trip bars, a transverse bar secured to said auxiliary trip bar at said pin and provided with spaced openings, spring catches having angular lips fitted in said openings, the inner end of the other auxiliary trip bar overlapping the first-mentioned trip bar, transverse operating shafts journaled at the opposite ends of the sliding frames and provided with spaced crank arms, springs connected with the operating shafts, and a trip block carried by each operating shaft, said crank arms being actuated by the wheels of a vehicle to cause the adjacent trip blocks to tilt the auxiliary trip bars and depress the spring catches and impart longitudinal movement to the adjacent sliding frame for moving the swinging doors to open position.

8. The combination with a building having swinging doors, of door-operating mechanism comprising sliding frames, links forming a pivotal connection between the inner ends of the sliding frames and said swinging doors, trip bars pivotally mounted within the frames and provided with terminal lugs, brackets disposed within the frames and independent thereof, auxiliary trip bars pivotally mounted in the brackets and having their inner ends overlapping the adjacent ends of the first-mentioned trip bars, a spring arranged beneath the inner overlapping ends of the auxiliary trip bars, a transverse bar carried by the inner end of one of the auxiliary trip bars, spring catches operatively connected with said transverse bar, and trip devices operable by engagement with the wheels of a moving vehicle for successively depressing the spring catches and subsequently actuating the sliding bars to move the doors to open position.

9. The combination with a building having sectional swinging doors and provided with a track for guiding said doors when moved to open and closed positions, of door-operated mechanism comprising longitudinally disposed sliding members arranged on opposite sides of the swinging doors, links forming a pivotal connection between the inner end of one of said sliding members and the adjacent sections of the doors, a transverse bar secured to the inner end of the other sliding member, links forming a pivotal connection between said transverse bar and the adjacent links of the first-mentioned sliding member, trip bars pivotally mounted within the sliding members, stationary brackets arranged within said members and independent thereof, auxiliary trip bars pivotally mounted in the brackets and having their inner ends overlapped, a coiled spring arranged beneath the overlapped ends of the auxiliary trip bars, a transverse bar carried by the inner end of one of the auxiliary trip bars and provided with spaced slots, spring catches having lips fitting in said slots, and trip devices operable by engagement with the wheels of a vehicle for depressing the spring catches and swinging the door sections laterally to open position.

DANIEL D. TIMMERMANN.